United States Patent [19]

Pressley et al.

[11] 3,732,164
[45] May 8, 1973

[54] NITROGEN REMOVAL FROM WASTE WATER BY BREAKPOINT CHLORINATION

[75] Inventors: Thomas A. Pressley, Springfield, Va.; Dolloff F. Bishop, Jr., Camp Springs, Md.

[73] Assignee: The United States of America as represented by the Administrator of the Environmental Protection Agency, Washington, D.C.

[22] Filed: Aug. 30, 1971

[21] Appl. No.: 175,902

[52] U.S. Cl. .................... 210/60, 210/61, 210/62
[51] Int. Cl. .................................... C02b 1/36
[58] Field of Search ........................ 210/60–62

[56] References Cited

UNITED STATES PATENTS

| 1,850,057 | 3/1932 | Baker et al. | 210/62 X |
| 1,943,487 | 1/1934 | Ruth | 210/61 |
| 1,973,168 | 9/1934 | Henderson et al. | 210/62 |
| 1,989,380 | 1/1935 | Romans | 210/62 |
| 2,452,928 | 11/1948 | Hampel | 210/62 |
| 2,661,333 | 12/1953 | Schein | 210/62 X |
| 3,189,518 | 6/1965 | Glasgow | 210/62 X |

OTHER PUBLICATIONS

Van Kleeck, L. W., "The Functions of Sewage Clorination," Wastes Engineering, June, 1956.

*Primary Examiner*—Reuben Friedman
*Assistant Examiner*—Thomas G. Wyse
*Attorney*—Alvin Browdy et al.

[57] ABSTRACT

Sodium hypochlorite or chlorine is used to oxidize the ammonia in raw, secondary and lime clarified municipal wastewaters. In systems with only ammonia as the chlorine demand, the breakpoint exhibits a minimum chlorine dose at approximately an 8:1 weight ratio of $Cl:NH_3-N$ in the pH range of 6 – 7. End products at the breakpoint are $N_2$, $NCl_3$, and $NO_3^-$. Qualitatively, the formation of the $N_2$ is completed in less than one minute in the pH range of 6 – 8. In wastewater, the breakpoint requires a minimum chlorine dose of approximately an 8:1 weight ratio of $Cl:NH_3-N$ in lime clarified secondary effluent. The chlorine dosage, to achieve the breakpoint increases as the degree of wastewater treatment decreases.

8 Claims, 4 Drawing Figures

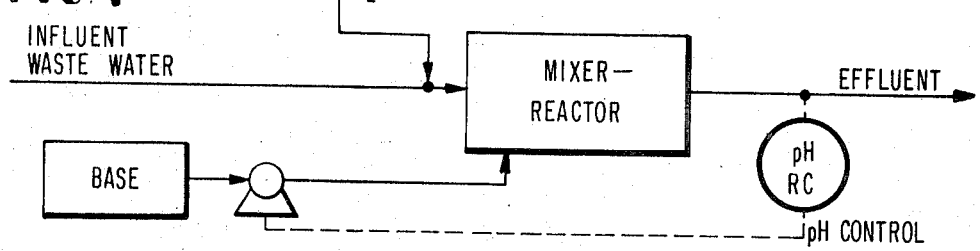
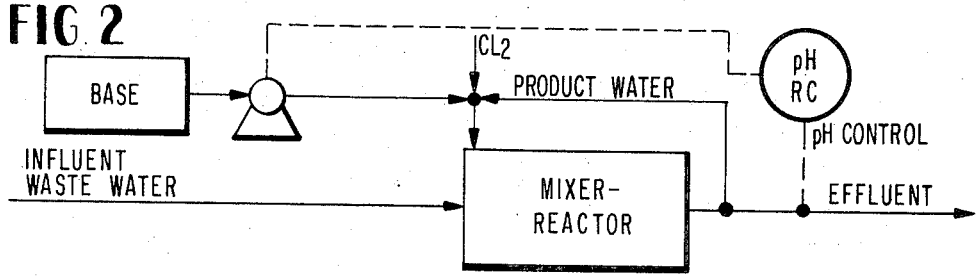
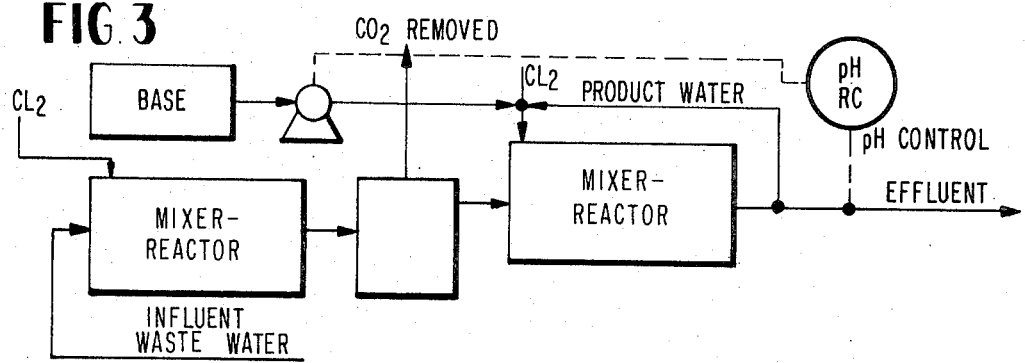
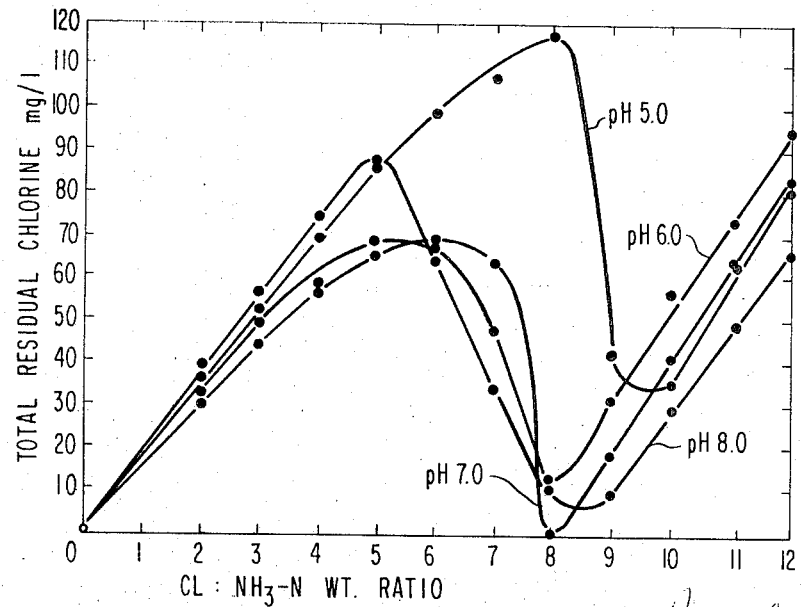

NITROGEN REMOVAL FROM WASTE WATER BY BREAKPOINT CHLORINATION

FIELD OF INVENTION

The present invention relates to the removal of bound nitrogen from wastewaters by the use of breakpoint chlorination, and, more particularly, to the control of the breakpoint chlorination reaction for removing ammonia from wastewaters on an industrial scale to provide an economical operation favoring the yield of nitrogen gas.

BACKGROUND OF THE INVENTION

Breakpoint chlorination, as practiced for many years in the water treatment industry, provides a physical-chemical means for removing ammonia from wastewaters. This procedure has been widely studied at $NH_3$—$N$ concentrations usually below 1 mg/l; in such dilute waters, chlorine reacts with the ammonia to form various chloramines

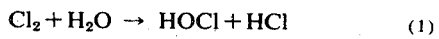
(1)

(2)

(3)

(4)

Chlorine is added to process waters until a point is reached where the total dissolved residual chlorine has reached a minimum (the breakpoint) and the $NH_3$—$N$ has disappeared.

In water at $NH_3$—$N$ concentrations of less than 1 mg/l, and before the breakpoint, the type of chloramine formed depends upon the pH. Spectrophotometric analyses had indicated that the chief constituent is monochloramine in the pH range of 7–8.5. As the pH decreases below 7, increasing amounts of dichloramine appear. In the pH range of 4.5–5.0, dichloramine is the chief product; below pH 4, nitrogen trichloride is the chief product.

Breakpoint chlorination studies on buffered synthetic ammonia samples at pH 7.0 had revealed that monochloramine concentration reaches a maximum at the 5:1 weight ratio of $Cl:NH_3$—$N$. As the weight ratio of $Cl:NH_3$—$N$ exceeds 5:1, the monochloramine breaks down to form dichloramine and ammonia (equation 5).

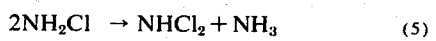
(5)

The dichloramine reaches a maximum concentration at the $Cl:NH_3$—$N$ weight ratio of about 7.5:1.

The prior art had also indicated that in water with less than 1 mg/l of $NH_3$—$N$, the reaction proceeds in competition with monochloramine formation (equation 2) until the chlorine dosage reaches the breakpoint at between the 9:1 and 10:1 weight ratio of $Cl:NH_3$—$N$. Other studies, however, had indicated that monochloramine is oxidized by excess chlorine under slightly alkaline conditions to nitrogen gas (equation 6).

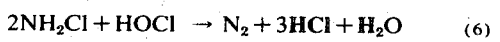
(6)

Stoichiometrically, the ammonia oxidation through monochloramine to $N_2$ corresponds to a 7.6:1 weight ratio of $Cl:NH_3$—$N$. The prior art had also suggested the occurrence of other end-products, including nitrate and nitrogen trichloride. In fact, the nitrogen trichloride produced (equation 4) in water treatment plants during breakpoint chlorination has been indicated to be a serious problem.

In wastewaters, the $NH_3$—$N$ concentration may be more than an order of magnitude higher than those normally encountered in natural waters. Thus, in wastewater treatment, where ammonia concentrations usually lie between 15 and 20 mg/l., the cost of large quantities of chlorine needed to reach breakpoint has generally inhibited serious consideration of the process. However, the major problem, which has in the past inhibited the commercial utilization of breakpoint chlorination, has been the production of $NCl_3$; regardless of the quantity of chlorine feed, it has previously not been possible to prevent $NCl_3$ formation (due to HCl production causing reduced pH which favors $NCl_3$) with the results of not achieving the desired breakpoint and additionally producing the highly dangerous poisonous substance $NCl_3$.

Consequently, the art has moved to three other methods of ammonia removal from wastewaters. These are air stripping; selective ion exchange; and nitrification-denitrification. All of these methods suffer from the basic disadvantage of undesirably high cost. In air stripping, heated air is necessary in winter because ammonia volatility decreases sharply with decreasing temperature, and the cost of heating such air is prohibitively expensive. In addition, there are expensive periodic requirements caused by cold weather freezing of the tower, calcium carbonate scaling of tower packing, and decreased stripping efficiency with decreased ambient temperatures for a selected air:liquid ratio.

Besides high cost of operation, the use of selective ion exchange provides a difficulty in ultimate disposal, the ion exchange merely concentrating the ammonia in the regenerant solution; thus, the regenerant must be further treated such as by air stripping, steam stripping or breakpoint chlorination, each with its hitherto inherent disadvantages. The major disadvantages of nitrification-denitrification are operation costs, large capital costs with the necessary large land requirements, and the sensitivity of the biological organisms to process upset.

SUMMARY

It is, accordingly, an object of the invention to overcome the defects of the prior art, such as indicated above.

It is another object to optimize the breakpoint chlorination reaction in the face of varying quantities and flows of wastewaters, and varying concentrations of ammonia in such wastewaters.

It is another object to provide for the economical conversion of ammonia in wastewaters to nitrogen.

It is yet another object to provide an improved method for the purification of wastewaters.

It is another object to control the breakpoint chlorination reaction for removing bound nitrogen from wastewaters on an industrial scale to provide an economical process.

These and other objects and the nature and advantages of the instant invention are accomplished by careful control during the breakpoint chlorination reaction of pH and chlorine dosage; in addition it is essential that the chlorine fed to the wastewater be thoroughly and quickly mixed therewith.

The advantages of the invention (controlled reaction conditions) over the previous uncontrolled reaction are that a specific product (nitrogen) can be formed with minimum byproduct formation. This now provides a highly reliable method for ammonia removal from wastewaters and at minimum chlorine cost.

Chlorination thus has the advantage of moderate cost, higher reliability, and insensitivity to changes in temperature and composition of the wastewater.

In addition, the treated wastewater is disinfected by chlorination in accordance with well known principles; furthermore, the free chlorine residual after breakpoint is a much more effective disinfectant than the chloramines that are produced in situ by normal disinfection procedures using small amounts of chlorine.

For a better understanding of the invention, possible embodiments thereof will now be described, in part with reference to the attached drawing, it being understood that the embodiments so described are illustrative and exemplary, and in no way limitative.

BRIEF DESCRIPTION OF THE DRAWING

FIG. 1 is a flow diagram showing an embodiment of the present invention;
FIG. 2 is a flow diagram of a second embodiment;
FIG. 3 is a flow diagram of a third embodiment; and
FIG. 4 is a graph showing $Cl:NH_3-N$ ratio at different pH valves.

DETAILED DESCTIPTION

For use of breakpoint chlorination for nitrogen removal at the $NH_3-N$ concentrations encountered in wastewaters, the end products of the reaction need to be known. The major products of the breakpoint reaction in wastewaters have now been identified and the formation and behavior of the nuisance residuals of $NCl_3$ and $NO_3^-$ as a function of pH, chlorine dosage, and temperature have now been determined in accordance with the present invention.

Ammonia removal by breakpoint chlorination proceeds according to the overall reaction:

$$3Cl_2 + 2NH_3 \rightarrow N_2 + 6HCl \quad (7)$$

The series of steps to oxidize the ammonia to nitrogen gas are:

$$Cl_2 + H_2O \rightarrow NOCl + HCl \quad (1)$$

$$NH_4^+ + HOCl \rightarrow NH_2Cl + H_2O + H^+ \quad (2)$$

$$2NH_2Cl + HOCl \rightarrow N_2 + 3HCl + H_2O \quad (6)$$

The "breakpoint" is defined as the point where the $NH_3-N$ is reduced to zero, free available chlorine is detected and the total residual chlorine is minimized. The following undesirable side reactions may also occur.

$$NH_2Cl + HOCl \rightarrow NHCl_2 + H_2O \quad (3)$$

$$NHCl_2 + HOCl \rightarrow NCl_3 + H_2O \quad (4)$$

$$NH_4^+ + 4Cl_2\ 4H_2O \rightarrow HNO_3 + H_2O = 8HCl + H^+ \quad (8)$$

While the above equations have long been known, the reaction conditions have never been intentionally manipulated to favor Equation (6) and minimize the products of Equations (3), (4), & (8). The successful control of these reactions makes possible the conversion of relatively large amounts of ammonia present in wastewaters to harmless nitrogen gas, with minimum formation of undesirable byproducts. Thus, the natural biological nitrogen cycle (ammonia conversion to nitrogen) is simulated chemically and at minimum chlorine dose.

To favor reaction (6) the pH should be controlled to maintain at all times, and at all locations in the reaction vessel, a pH between 5.8 and 9.5 and preferably in the range of 6 to 8. At pH 6 – 8 the reaction proceeds fastest with the least quantities of chlorine and base; below pH 5.8 undesirably high amounts of $NCl_3$ are produced and there is a high chlorine demand, while at pH above about 9.5 other undesirable side reactions occur. However, because of acid production during the chlorine hydrolysis (reaction 1) the pH of the influent may exceed 9.5.

In addition to pH control, the chlorine dosage must be carefully maintained, to minimize $NCl_3$ and chloramine formation, within the range of 8 to 10 parts of chlorine per part of $NH_3-N$ for most municipal wastewaters. To maintain the desired ratio of reactants and the desired pH value, at all locations within the reactor zone, it is essential to provide adequate mixing of the introduced chlorine with the wastewater.

When the influent wastewater is raw, untreated wastewater, the ratio of chlorine feed to $NH_4-N$ content should normally be about 10:1. When the influent wastewater is highly treated, such as lime clarified and filtered secondary effluent, about 8 parts per weight of chlorine are usually needed per part of $NH_3-N$. Since wastewater may contain from less than 8 to more than 30 mg./l., but will generally contain 15–20 mg/l. of ammonia, it is seen that the quantity of chlorine necessary to remove the ammonia may lie between 64 and 300 mg./., but will generally lie between 120 and 200 mg/l. of chlorine, and more normally between 120 – 170 mg/l of chlorine.

The amount of chlorine required for breakpoint depends upon the ammonia and non-ammonia chlorine demand and the amount of residual free chlorine desired in the wastewater. In general, as the degree of wastewater treatment before the breakpoint process increases, the amount of non-ammonia chlorine demand decreases and the chlorine requirement approaches and theoretical 7.6:1 weight ratio of Cl to $NH_3-N$ of Equation 7. For example: a 10:1 $Cl:NH_3-N$ weight ratio was required in the examples to breakpoint raw wastewater, and approximately an 8:1 ratio was needed for lime clarified and filtered secondary effluent.

The inlet ammonia concentration and wastewater flow will vary with time. The chlorine dosage must be set and controlled in proportion to the ammonia feed. With too low a chlorine dosage, the reaction will not go to completion and chloramines will be the end product.

Nitrogen trichloride will be formed if more than a little excess chlorine (beyond that needed for breakpoint) is added to the system.

In FIG. 1 there is shown a mode of operation where the chlorine, in continuously controlled amount, is injected into the influent wastewater immediately before such wastewater is fed to a suitable mixer-reactor. Also fed to the mixer is a variable amount of base, determined by the preselected pH of the effluent leaving the reactor.

FIG. 2 shows a slightly different system in which a given proportion of the effluent leaving the mixer-reactor is recycled and wherein the base, the controlled amount of chlorine and the recycle are mixed prior to being injected into the reactor where they are thoroughly mixed with the influent wastewater.

In FIG. 3, which represents the use of two or more stages, the influent wastewater is mixed and reacted with a first and partial charge of chlorine in a first mixer-reactor. The product is then passed to a zone for removal of carbon dioxide, and then to a second mixer-reactor where, as in the embodiment of FIG. 2, it is mixed with a mixture of chlorine, recycle and base.

The principles of the present invention, which have been first studied in the laboratory and then demonstrated in a 50,000 gallon per day pilot plant, are delineated below:

The chlorine and sufficient base, such as sodium, potassium or calcium hydroxide — or sodium hypochlorite in lieu of the free chlorine and base — are added to various wastewaters containing ammonia, such as raw wastewater, primary effluent, secondary effluent, tertiary effluent such as lime clarified and filtered secondary effluent, lime clarified and filtered raw wastewater, selective ion exchange effluent, or regenerant brine from selective ion exchange. Breakpoint chlorination of ammonia concentrations normally encountered in wastewaters usually produces more acid than can be neutralized by the buffer capacity of the wastewater. Stoichiometrically (Equations 1, 2 and 6) 14.25 mg/l. of $CaCO_3$ alkalinity are required to neutralize the acid produced by the oxidation of 1 mg/l $NH_3$—N to $N_2$. If sufficient alkalinity is not present to maintain the pH of the reaction greater than about 5.8, base must be added.

The chlorine and base may be added to the process stream separately as in FIG. 1, or together, as in FIG. 2. In proceeding according to FIG. 2, a portion of the product water after breakpoint may be used to operate the chlorinator.

Good homogeneous mixing must be available at the chlorine application point especially in the pH range 6–8 where the reaction is nearly instantaneous. Incomplete mixing will cause local high concentrations of chlorine and low pH, causing nitrogen trichloride production. The mixing can be accomplished in line or, if necessary, in an agitated reactor. Reaction at low pH, producing noxious $NCl_3$, must be avoided.

The temperature of the wastewater, in the range of interest (40°– 100° F.), does not significantly affect the product distribution on the required chlorine dosage.

Breakpoint chlorination of any wastewater can also produce a considerable decrease in total alkalinity (bicarbonate concentration, $HCO_3^-$) if the chlorine is added in two or more steps as in FIG. 3. With a predose of chlorine (approximately half the requirement) and with the pH maintained above about 5.8, the water alkalinity (bicarbonate concentration) will be reduced by the acid ions from chlorine hydrolysis according to the following reaction.

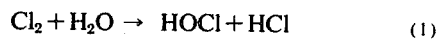

$$Cl_2 + H_2O \rightarrow HOCl + HCl \qquad (1)$$

$$H^+ + NCO_3^- \rightleftharpoons H_2CO_3 \rightleftharpoons CO_2 + H_2O \qquad (9)$$

This will, of course, reduce pollution by reducing bicarbonate discharge into the receiving body of water.

To be effective in reducing the $HCO_3^-$ concentration, the $CO_2$ produced by the hydrolysis of the first chlorine dose must be removed from the water before the second chlorine dose. The second dose, preferably with base addition and under pH control, will achieve breakpoint. This split-feeding method also reduces the reaction time encountered with high pH feed systems by permitting the breakpointing to completely occur at a lower pH.

The invention will be better understood for consideration of the following working examples, which are offered illustratively:

EXAMPLE I SERIES

The chlorination studies were performed (1) in synthetic buffered systems, usually with initial $NH_3$—N concentrations of 20 mg/l, to eliminate effects from other substances reacting with chlorine and (2) in raw, secondary, and lime clarified municipal wastewaters with $NH_3$—N concentrations ranging from 8 – 15 mg/l.

In end product identification studies on buffered aqueous systems, the gaseous products were qualitatively analyzed for $N_2$, $O_2$, and $N_2O$. The procedure involved purging the aqueous sample containing 20 mg/l $NH_3$—N and buffered at pH 7.5 with helium to remove atmospheric nitrogen in a closed system attached to a gas chromatograph. The sample was then treated with nitrogen-free standard sodium hypochlorite at a dosage equal to a 10:1 weight ratio of $Cl:NH_3$—N. The gaseous products of the reaction were then flushed through the gas chromatograph with helium.

A test was also performed to identify the presence of any nitric oxide ($NO$) or nitrogen dioxide ($NO_2$). An enclosed breakpoint chlorinated sample was purged with air into a cold solution of $0.02N\ H_2SO_4$ to remove any $NO$ or $NO_2$ formed during the chlorination. In the procedure, the $NO$ was oxidized to $NO_2$ by the oxygen in the air and absorbed in the $0.02N\ H_2SO_4$ as nitrous and nitric acids. The $0.02N\ H_2SO_4$ solution was then analyzed for $(NO_3^- + NO_2^-)$—N.

Spectrophotometric scanning of both chlorinated aqueous samples and their $CCl_4$ extracts was also performed to determine other end-products. The samples, after 2 hours of contact with the chlorine, were placed in a recording spectrophotometer and scanned over the spectral range of 200–500 μ.

In the quantitative studies, aqueous ammonia or wastewaters samples were manually mixed in separatory funnels with increasing dosages of standard sodium hypochlorite over the pH range of 5–8. A 2-hour contact time was provided for all systems. The samples, after chlorination, were analyzed for $(NO_3^- + NO_2^-)$—N, $NCl_3$—N, $NH_3$—N, $NH_2Cl$ and $NHCl_2$—N, TK- —N, total residual chlorine, free available chlorine and pH.

Quantitative temperature studies were also conducted at 5°, 15°, 25°, and 40° C. on aqueous ammonia samples containing 20 mg/l $NH_3$—N and buffered at pH 6.0 to determine temperature effects on the end-products. Multiple samples in separatory funnels were cooled to the designated temperature in a constant temperature bath and treated with increasing dosages of precooled sodium hypochlorite. The samples were then manually mixed and allowed to stand at the selected temperature for 2 hours before analysis.

The following results were obtained:

1. Synthetic Buffered Systems:

In buffered solutions at pH 7.5 with 20 mg/l $NH_3$13 N, gas chromatographic analysis for $N_2$, $O_2$, and $N_2O$ at the breakpoint detected only $N_2$. Since $O_2$ was not detected, the formation of $N_2O$ with subsequent decomposition to $N_2$ and $O_2$ did not occur. Qualitatively, the formation of the $N_2$ was completed in less than 1 minute. The tests for nitric oxide (NO) and nitrogen dioxide ($NO_2$) revealed that neither of these compounds were present.

Spectrophotometric scans (200 - 500 $\mu$) of the buffered solution treated with increasing dosages of chlorine up to Cl:$NH_3$—N weight ratio of 7.5:1 revealed adsorption peaks at 243 $\mu$ for monochloramine and at 205 $\mu$ for nitrate; above the 7.5:1 ratio the peak at 243 $\mu$ disappeared and a peak at 287 $\mu$ appeared and increased with increasing chlorine doses. The control sample containing only the buffered solution with free chlorine and without $NH_3$—N, produced a peak only at 287 $\mu$. Thus, the peak at 287 $\mu$ above the 7.5:1 ratio of Cl:$NH_3$—N was produced by free chlorine.

The absorbance produced by monochloramine at 243 $\mu$ increased linearly with increasing chlorine dosages to a maximum at the 5:1 weight ratio of Cl:$NH_3$—N and then decreased to near zero at approximately the 7.6:1 ratio. The strong peak produced by $NO_3^-$ at 205 $\mu$ increased with increasing chlorine dosage through the 12:1 weight ratio of Cl:$NH_3$—N and confirmed the formation of $NO_3^-$ during chlorination. In summary, spectral scanning of the aqueous solutions indicated only the formation and decomposition of monochloramine, the gradual formation of $NO_3^-$—N and the presence of free available chlorine after the breakpoint. The $CCl_4$ extracts, scanned in the spectrophotometer in the range of 200–500 $\mu$ against a reference control blank, produced strong $NCl_3$ peaks at 265 and 345 $\mu$ only after the chlorine dosage exceeded the 7.5:1 weight ratio of Cl:$NH_3$—N.

The addition of chlorine to buffered aqueous samples containing 20 mg/l $NH_3$—N at pH 7.0 produced a typical breakpoint curve with the complete removal of the ammonia and a minimum total residual chlorine concentration of about 0.6 mg/l at approximately 8:1 weight ratio of Cl:$NH_3$—N (FIG. 4). The chlorination studies of buffered solutions at pH 7.0 containing 1 mg/l $NH_3$—N also reached the breakpoint at approximately an 8:1 ratio of Cl:$NH_3$—N. In all test on buffered aqueous systems in the pH range of 6–7, the breakpoint occurred at chlorine doses approximately equal to an 8:1 (stoichiometric ratio 7.6:1, equations 2 and 6) weight ratio of Cl:$NH_3$—N. Outside of the 6–8 pH range, the chlorine dose required for the breakpoint increased (FIG. 4).

In pH studies on synthetic samples containing 20 mg/l $NH_3$—N, the formation of $NO_3^-$—N at the breakpoint increased with increasing pH from about 0.3 mg/l (1.5 percent of the $NH_3$—N) at pH 5.0 to about 2.0 mg/l (10 percent of the $NH_3$—N) at pH 8.0. With increasing chlorine dosages above the breakpoint, the $NO_3^-$—N formation increased sharply at pH 6.0 and above, but increased only slightly in the pH range of 5–6. Thus, low pH (5–6) produced minimum amounts (0.3 mg/l) of $NO_3^-$—N.

In contrast, the amount of $NCl_3$—N formed at the breakpoint decreased from approximately 0.3 mg/l (1.5 percent) at pH 5.0 to 0.05 mg/l (0.25 percent) at pH 7 or 8. In the pH range of 7–8, a $NCl_3$—N concentration of less than 0.1 mg/l occurred at the breakpoint. As chlorine dosages exceeded the breakpoint, the formation of $NCl_3$ increased sharply at and below pH 7.0. At pH 8.0, however, the $NCl_3$ concentration increased but never exceeded approximately 0.3 mg/l for chlorine dosages up to a 12:1 weight ratio of Cl:$NH_3$—N. With $NCl_3$ a greater nuisance potential then nitrate, chlorination at the 9:1 weight ratio of Cl:$NH_3$—N (slightly above the breakpoint) minimized $NCl_3$ residuals at pH 8 but maximized nitrate formation.

The 0.05 mg/l of $NCl_3$ at the breakpoint (produced by the oxidation of dichloramine) also indicated only small amounts of dichloramine formed above pH 7. Analysis for dichloramine revealed less than 0.1 mg/l $NHCl_2$—N above pH 7 after 2 hours of contact time for all chlorine dosages.

Breakpoint chlorination studies on buffered aqueous systems at pH 6.0 were conducted in the temperature range of 5°–40° C. These tests did not reveal significant changes in the reaction products after the 2 hour contact time. Complete removal of the $NH_3$—N was achieved at all temperatures (Table 1).

TABLE I

Breakpoint Chlorination Temperature Studies

| Temp. | Cl:N wt. ratio | $NH_3$–N mg/l | $NO_3^-$ + $NO_2^-$–N mg/l | $NCl_3$–N mg/l |
|---|---|---|---|---|
| 5° C. | 0 | 20.0 | 0.00 | 0.00 |
| | 5:1 | 9.20 | 0.10 | 0.00 |
| | 6:1 | 6.10 | 0.18 | 0.00 |
| | 7:1 | 1.19 | 0.27 | 0.00 |
| | 8:1 | 0.00 | 0.43 | 1.10 |
| | 9:1 | 0.00 | 0.50 | 1.89 |
| | 10:1 | 0.00 | 0.60 | 3.91 |
| | 11:1 | 0.00 | 0.70 | 5.67 |
| 15° C. | 0 | 20.0 | 0.00 | 0.00 |
| | 5:1 | 9.69 | 0.05 | 0.00 |
| | 6:1 | 6.00 | 0.05 | 0.00 |
| | 7:1 | 1.22 | 0.16 | 0.00 |
| | 8:1 | 0.00 | 0.30 | 1.10 |
| | 9:1 | 0.00 | 0.43 | 1.90 |
| | 10:1 | 0.00 | 0.52 | 3.90 |
| | 11:1 | 0.00 | 0.60 | 5.67 |
| 40° C. | 0 | 20.0 | 0.00 | 0.00 |
| | 5:1 | 9.20 | 0.00 | 0.00 |
| | 6:1 | 6.70 | 0.10 | 0.00 |
| | 7:1 | 3.90 | 0.15 | 0.00 |
| | 8:1 | 0.00 | 0.42 | 1.10 |
| | 9:1 | 0.00 | 0.47 | 1.92 |
| | 10:1 | 0.00 | 0.55 | 4.00 |
| | 11:1 | 0.00 | 0.66 | 5.70 |

Contact time = 2 hours. pH 6.0

2. Municipal Wastewaters:

In breakpointing of unclarified raw and lime clarified secondary wastewaters ($NH_3$—N concentrations of 8–15 mg/l) with sodium hypochlorite, the $CaCO_3$ alkalinities of 80–120 mg/l in the water maintained the pH of all the samples between 6.5 and 7.5. The chlorine demand required for the breakpoint decreased and approached the stoichiometric amount (equation 2 and 6) for oxidation of $NH_3$ to $N_2$ as the degree of wastewater pretreatment increased. As an example, a chlorine dosage equivalent to a 10:1 weight ratio of $Cl:NH_3$—N was required to breakpoint raw wastewater while a 9:1 weight ratio was required in the secondary effluent and less than an 8:1 weight ratio of $Cl:NH_3$—N for lime clarified and filtered secondary effluent.

If chlorine is employed rather than sodium hypochlorite, the breakpoint chlorination of ammonia concentrations normally encountered in wastewaters may produce more acid than can be neutralized by the buffer capacity of the wastewater. Stoichiometrically (equation 1 and 6) 14.28 mg/l of $CaCO_3$ alkalinity are required to neutralize the acid produced by the oxidation of 1 mg/l $NH_3$—N to $N_2$. Therefore, a wastewater containing 20 mg/l $NH_3$—N requires an alkalinity of about 286 mg/l. Since the amount of $NCl_3$ formed before the breakpoint increases with decreasing pH, any excess acid produced must be neutralized with proper mixing to avoid both excess local chlorine concentrations and low pH. Thus if a lime clarified secondary wastewater contains 20 mg/l $NH_3$—N, at an optimal $Cl:NH_3$— weight ratio of 8:1, approximately 160 mg/l of chlorine are required for breakpoint chlorination. At chlorine costs of $0.04/lb., the chlorine cost would be $0.05 per 1000 gallons of treated water. The variable cost of neutralizing excess acid in a specific wastewater and other handling costs must be added to the chlorine cost.

Total kjeldahl nitrogen analyses revealed near complete removal of the $NH_3$—N, but only a slight reduction of the organic nitrogen within the two hour contact time. The nuisance residuals of nitrate and nitrogen trichloride-nitrogen at the breakpoint were always less than 1 mg/l. The formation of $NCl_3$ decreased with decreasing wastewater pretreatment, and did not occur in the raw wastewater.

In summary, breakpoint chlorination in buffered aqueous solutions of 20 mg/l of $NH_3$—N in the pH range of 5.0 – 8.0 oxidized the ammonia chiefly to $N_2$ with only small amounts of $NO_3^-$ and $NCl_3$ also formed. During chlorination, monochloramine concentrations increased with chlorine dose through about a 5:1 weight ratio of $Cl:NH_3$—N and then decreased to zero at the breakpoint. Only traces of $NHCl_2$ occurred in the 5–8.0 pH range with less than 0.1 mg/l above pH 7. Potential products of $N_2O$, $O_2$ (from the decomposition of $N_2O$), NO and $NO_2$ did not occur. The minimum chlorine dosage for the breakpoint of less than 8.1 weight ratio of $Cl:NH_3$—N occurred in the range of pH 6 to 7.

The amount of $NO_3^-$ produced at the breakpoint increased from about 1.5 percent of the $NH_3$—N at pH 5 to about 10 percent at pH 8.0 in the aqueous systems. In contrast, the $NCl_3$ production at the breakpoint decreased from approximately 1.5 percent of the $NH_3$—N at pH 5 to 0.25 percent at pH 8.0. In the 2 hour contact time of the study, breakpointing at temperatures of 5° – 40° did not change the amounts of the products or the required chlorine dose.

In the pH range of 6.5 – 7.5, breakpoint chlorination of ammonia in wastewaters oxidized 95 – 99 percent of the ammonia to nitrogen gas and chemically achieved the results of the natural biochemical nitrogen cycle. When chlorine demands other than ammonia were minimized by pretreatment (lime clarified secondary effluent), the chlorine dosages (8:1 weight ratio of $Cl:NH_3$—N) required for the breakpoint approached the stoichiometric (7.6:1 weight ratio) dosage to oxidize ammonia to $N_2$. Residuals of $NO_3^-$ and $NCl_3$ were also formed in the wastewaters but with initial $NH_3$—N concentrations of 8–15 mg/l, the $NO_3^-$ — N residuals never exceeded 0.5 mg/l at the breakpoint; and the $NCl_3$ —N residual never exceeded 0.5 mg/l.

EXAMPLE II SERIES

As an example of the parameters of the breakpoint reaction, secondary effluent at pH 7.0 containing 20 mg/l $NH_3$—N reached breakpoint at an 8.5:1 $Cl:NH_3$—N weight ratio. Base usage was 1.3 pounds sodium hydroxide per pound of chlorine. No nitrogen trichloride was formed and nitrate production was approximately 1 mg/l. Free residual chlorine was 2 mg/l (indicating zero ammonia) and total residual chlorine was 6 mg/l. The reaction was complete in less than one minute. Good mixing was achieved, reactor effluent pH was controlled at 7.0 and the chlorine dosage was maintained at 170 mg/l.

Breakpoint chlorination of high pH wastewater, such as lime clarified effluent (inlet pH greater than 9.0), requires several minutes reaction time to complete the conversion. For example, with an inlet pH of 9.3 and a reactor outlet pH controlled at 7.0, the total reaction time was approximately 8 minutes. Nitrogen trichloride was not formed.

EXAMPLE III SERIES

In a pilot plant operation, there was used as a chlorination reactor, a 1,200 gal. vessel, 4 ft. in diameter and 12 ft. tall. The vessel was an existing pH control tank which was larger than needed for chlorination and only a portion of its volume was used. The reaction volume was the bottom three feet of the vessel (310 gal.) which was divided into three equal sections, separated by epoxy-coated plywood inserts. In each section, a propeller mixer mounted on a common shaft, driven by a three h.p. motor, was rotated at 224 r.p.m.

A pump on the effluent stream recycled 11 gal./min. into the first mixing stage. Chlorine was added to the recirculation loop through a Wallace & Tiernan chlorinator and injector nozzle. The dose rate was manually set to provide dosage equal to an 8.5 – 9.0:1 Cl:N weight ratio. The pH of the water in the reactor was maintained automatically by pumping a 1 – 2% NaOH solution into the line ahead of the chlorine injector. The NaOH feed was controlled by an inline pH probe on the discharge effluent. The chlorinated effluent was then pumped downstream to carbon columns.

A Technicon Auto-Analyzer monitored the $NH_3$—N concentration of the feed and effluent. The free chlorine in the effluent was titrated manually.

In the study, the average analysis of the feed (filtered secondary effluent) for BOD COD, TOC, and suspended solids was 16 mg./l., 41 mg/l., 18 mg./l and 25 mg./l., respectively. The pH of the feed ranged from 7.0 to 7.3 with an alkalinity of 120 – 150 mg./l. as $CaCO_3$. During all the runs, the water temperature was 58° F. The flow rates ranged from 25 to 35 gal./min. with a residence time in the reaction zone from 6.8 to 8.6 minutes.

During construction of the systems described above, chlorination was also attempted on an effluent leaving an ion exchanger in the plant using an eductor to mix chlorine water and wastewater in a 2-inch pipe. The $NH_3$—N ranged from 3.0 to 8.0 mg/l. and the flow rate was 20 gal./min. Samples were taken 6 feet downstream of the eductor. The ion exchange effluent was also chlorinated in the laboratory with the pilot plant's chlorine water.

Chlorination of the ion exchange effluent in the eductor mixing system did not achieve breakpoint and excessive $NCl_3$ formation occurred. The pH decreased from 7.3 to 6.5. A comparative test in the laboratory with good mixing achieved breakpoint between the 8:1 and 9:1 Cl:N weight ratio. The pH decreased from 7.6 before chlorination to 6.1 at the breakpoint. Another plant test with the pH controlled at 7.0 by caustic addition still did not achieve breakpoint. Thus, the eductor did not provide adequate mixing thereby highlighting the importance of adequate mixing.

Chlorination of filtered secondary effluent in the chlorination reactor achieved breakpoint in the pH range 6.0 to 8.0. Typical breakpoint data at pH 7.0 – 7.5 revealed the relation between $NH_3$—N, free chlorine, and total residual chlorine. Breakpoint occurred at a chlorine dosage between the 8 – 9:1 Cl:N weight ratio.

In repeated tests, (Table 2) the influent $NH_3$—N concentrations, ranging from 12.9 to 21.0 mg./l., were reduced to less than 0.1 mg./l. $NH_3$—N with chlorine dosages from 8.4 to 9.2:1 Cl:N weight ratio. The amount of free chlorine residual increased with increasing overdoses of chlorine.

Table 2: Breakpoint Chlorination of Filtered Secondary Effluent

| Influent $NH_3$—N mg./l. | Effluent | pH | Cl:N Wt. Ratio | Free Cl⁻ mg./l. |
|---|---|---|---|---|
| 15.4 | <0.1 | 8.0 | 8.4:1 | 2.5 |
| 12.9 | <0.1 | 7.0 | 9.0:1 | 3.4 |
| 13.9 | <0.1 | 6.0 | 8.4:1 | 7.0 |
| 21.0 | <0.1 | 7.0 | 8.5:1 | 2.0 |
| 17.0 | <0.1 | 7.5 | 9.2:1 | 8.5 |
| 20.3 | <0.1 | 6.0 | 8.8:1 | 6.5 |

Caustic requirements in the pH range 6.0 to 7.9 increased with increasing chlorine dose. Based on Equation 1, the stoichiometric NaOH requirement for maintaining an influent pH was 1.13 pounds NaOH per pound of chlorine added. Calcium hydroxide solution was also used. One run at pH 7.0 indicated approximately 1.0 pound CaO required per pound of $Cl_2$.

The formation of nitrate was minimized by operating in the lower pH range. In contrast, the formation of nitrogen trichloride decreased with increasing pH. More importantly, $NCl_3$ concentration increased sharply for chlorine dosage above the breakpoint.

Thus, good mixing, pH control, and chlorine dosage control was required to minimize undesirable by-products.

Because $NCl_3$ formation is more dependent on chlorine dosage, rather than pH, operation at pH between 6 and 7, with good chlorine dosage control, would minimize both $NO_3^-$ and $NCl_3$. If good chlorine dosage control is not achieve, operation at pH 8 would minimize the noxious $NCl_3$ formation, giving a slightly increased $NO_3^-$—N residual.

It will be obvious to those skilled in the art that various changes may be made without departing from the scope of the invention and the invention is not to be considered limited to what is described in the specification.

What is claimed is:

1. A method for the removal of bound nitrogen from wastewater by the use of breakpoint chlorination comprising
    feeding a stream of wastewater having an $NH_3$—N content of about 8 – 30 mg./l. to a mixer-reactor;
    feeding a stream of chlorine material, selected from the group consisting of an alkali metal hypochlorite and free chlorine, to said mixer-reactor in an amount of about 65 – 300 mg./l. of chlorine to provide a ratio of Cl:$NH_3$ of about 8–10:1;
    maintaining the pH within said mixer-reactor at a value of about 5.8 to 9.5 and
    thoroughly mixing said streams in said mixer-reactor immediately upon the entrance of said streams to said mixer-reactor so as to provide said pH value of about 5.8 to 9.5 uniformly throughout said reactor and to insure a uniform breakpoint chlorination reaction.

2. A method in accordance with claim 1 wherein said wastewater is a raw or primary wastewater and said ratio of Cl:$NH_3$—N is maintained at about 10:1.

3. A method in accordance with claim 1 wherein said wastewater is secondary or tertiary effluent or chemically clarified raw wastewater, and said ratio of Cl:$NH_3$—N is maintained at about 8:1.

4. A method in accordance with claim 1 wherein said chlorine material is free chlorine and is fed at the rate of about 120 – 170 mg./l.

5. A method in accordance with claim 1 further comprising recycling a portion of the product leaving said mixer-reactor.

6. A method in accordance with claim 1 wherein said chlorine material is free chlorine, and said pH is maintained at 6 – 8 by additionally feeding a stream of hydroxide to said mixer-reactor.

7. A method in accordance with claim 6 further comprising recycling a portion of the product, and wherein said stream of chlorine, said stream of hydroxide and said recycled product are mixed prior to feeding to said mixer-reactor.

8. A method in accordance with claim 7 further comprising a preliminary partial chlorination wherein wastewater is mixed with a small amount of chlorine, followed by $CO_2$ removal.

* * * * *